United States Patent [19]

Ritter et al.

[11] 4,254,753
[45] Mar. 10, 1981

[54] SPEED GOVERNOR FOR FUEL INJECTED INTERNAL COMBUSTION ENGINES

[75] Inventors: Ernst Ritter; Reinhard Schwartz, both of Stuttgart, Fed. Rep. of Germany

[73] Assignee: Robert Bosch GmbH, Stuttgart, Fed. Rep. of Germany

[21] Appl. No.: 45,893

[22] Filed: Jun. 6, 1979

[30] Foreign Application Priority Data

Jun. 10, 1978 [DE] Fed. Rep. of Germany ....... 2825523

[51] Int. Cl.³ .......................... F02D 1/10; F02D 1/00
[52] U.S. Cl. ..................................... 123/366; 123/365; 123/364
[58] Field of Search ..... 123/140 MC, 140 R, 140 VS, 123/363, 364, 365, 366, 368

[56] References Cited

U.S. PATENT DOCUMENTS

| | | | |
|---|---|---|---|
| 2,806,519 | 9/1957 | Basford | 123/140 MC |
| 2,825,321 | 3/1958 | Anders | 123/140 MC |
| 2,996,053 | 8/1961 | Evans | 123/140 VS |
| 4,143,634 | 3/1979 | Ritter | 123/140 R |

FOREIGN PATENT DOCUMENTS

272061 2/1951 Switzerland ...................... 123/140 VS

*Primary Examiner*—Charles J. Myhre
*Assistant Examiner*—Carl Stuart Miller
*Attorney, Agent, or Firm*—Edwin E. Greigg

[57] ABSTRACT

A speed governor is proposed for fuel injected internal combustion engines capable of correcting the amount and/or mass of the injected fuel set by the governor, in order to maintain engine power at a fluctuating fuel temperature. The governor contains a supporting lever which retains the supporting pin of a control lever movable by the control member. The control lever is coupled with the fuel feed rate adjusting member of the injection pump, and the supporting lever is pivotable in the direction of an increase in the fuel feed rate, by means of a servo actuator of a correction device operating in dependence on the fuel temperature, when the fuel temperature rises. This correction step effective on the supporting lever also makes it possible to shut off the engine, independently of the fuel feed rate correction, by means of a shutoff lever effective on the supporting lever.

17 Claims, 6 Drawing Figures

SPEED GOVERNOR FOR FUEL INJECTED INTERNAL COMBUSTION ENGINES

BACKGROUND OF THE INVENTION

The invention relates to a speed governor for fuel injected internal combustion engines.

Speed governors of the type which form the subject matter of this invention are known wherein the rotary position of a supporting lever, connected with a shutoff lever and a control lever, the latter being moved in dependence on engine speed, can be varied to adapt the fuel feed rate by means of a correction device operating in dependence on the external atmospheric pressure or on the supercharger air pressure in the engine.

These known correction devices are very bulky and expensive and permit merely an adaptation of the fuel feed rate to the air pressure. Due to the fact that the fuel injection pumps convey in each case only a constant volume corresponding to the position of the feed rate adjusting member, it has been found that the caloric value of the fuel varies at fluctuating fuel temperatures to such an extent that the engine power drops, for example, with a rise in the fuel temperature. In order to maintain the engine power, however, it is not only necessary to equalize the caloric value of the injected fuel, changed by the change in the specific gravity of the fuel, but it is also necessary to balance the engine power, which changes when the engine is hot, in spite of a constant fuel mass.

OBJECT AND SUMMARY OF THE INVENTION

It is a principal object of this invention to provide a speed governor which can be corrected for temperature variations.

The speed governor of this invention has the advantage, as compared with the conventional governors, that the desired fuel feed rate correction dependent on the fuel temperature is attained in a simple way without modifying the basic construction of the speed governor. The governor is provided with a supporting lever pivoted by a servo actuator of a correction device. The supporting lever has a supporting pin which defines a rest point for the control lever of the governor. By means of this fuel feed rate correction, it is possible to consider the changed caloric value of the fuel as well as the engine power which changes in case of temperature fluctuations. The engagement of the servo actuator at the supporting lever can be effected advantageously from outside of the governor without changing the internal governor parts and makes it possible to provide a very compact structure as well as good adaptation to the installation conditions at the engine, by a lateral or end-face mounting of the correction device.

It is advantageous to construct the servo actuator of the correction device as an expandible material gauge (temperature-dependent expansion element) which is inserted in the fuel line. This arrangement affords an uncomplicated and reaction free transmission of control displacements to the supporting lever.

An arrangement which saves space, especially in the longitudinal direction of the governor, is obtained by a lateral attachment of the correction device to the governor. This arrangement is reflected by the features wherein the pivot axle of the supporting lever is rotatable by a correction lever, operable against the force of a resetting spring.

An especially compact basic adjusting means for the correction device, wherein the basic adjustment can be conducted in a simple way with only a few components, can be obtained by other features. The control surface on the control sleeve, having preferably the shape of a truncated cone, can be modified as desired in its configuration and thus can be adapted to any desired correction characteristic.

By means of other features, a very simple construction of a correction device to be attached laterally is made possible, wherein translation from the correction displacement to the pivot angle of the pivot axle pertaining to the supporting lever, can be attained in a simple way by means of a sensor member, fashioned as a setscrew, and being adjustable in its effective lever arm length.

A very effective basic setting of the correction lever, which is not accessible from the outside without opening the housing of the device, is made possible by other features of the invention.

By means of other features set forth, it is possible, in a governor provided with a shutoff means, to effect a correction of the fuel feed rate dependent on the fuel temperature and not affected by the shutoff means within the entire range of the governor control characteristic, as well as to effect a shutoff unaffected by the correction device in any operating condition of the governor.

If the installation conditions in the engine do not permit a lateral attachment of the correction device, then the necessary fuel-temperature-dependent correction of the position of the fuel feed rate adjusting member of the injection pump can be attained by other features.

In spite of the fact that the correction device is mounted to the end face of the governor, a very short structure is yet attainable as compared with conventional arrangements; and a basic setting of the control sleeve is made possible by other features without the need for additional connecting members to provide a change in mutual distances.

BRIEF DESCRIPTION OF THE DRAWINGS

Three embodiments of the invention are illustrated in the drawings and will be explained in greater detail in the following detailed description. In the drawings.

DETAILED DESCRIPTION OF THE EMBODIMENTS

Figure 1:
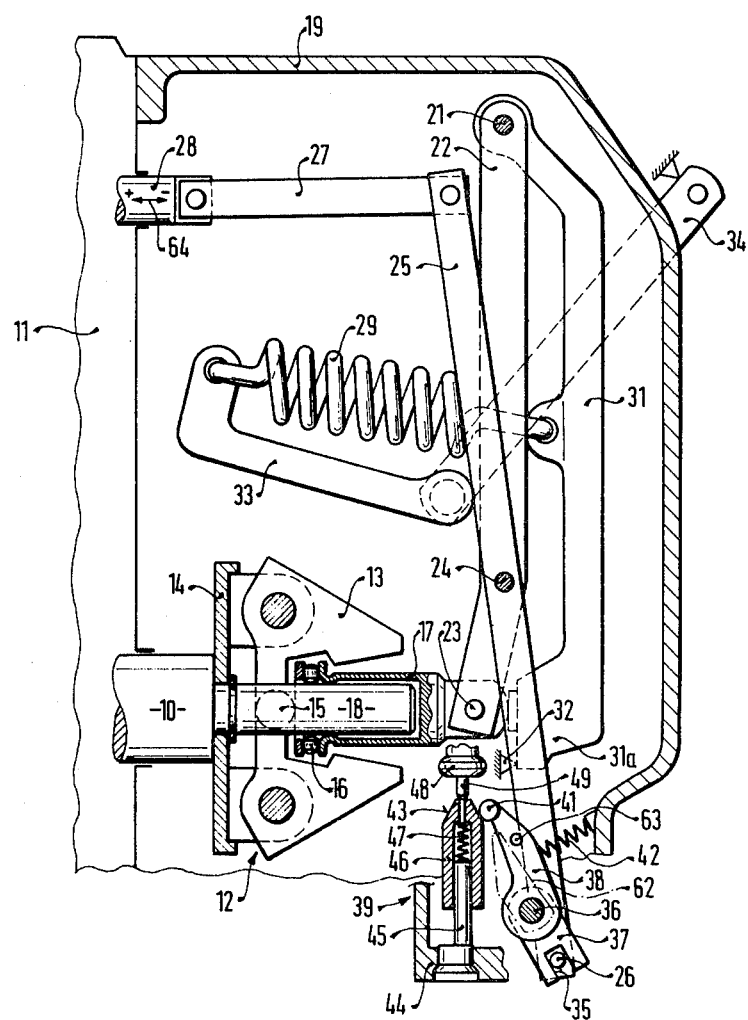
FIG. 1 is a simplified partial cross sectional view of a first embodiment of the speed governor according to the present invention, embodied as a centrifugal speed governor.

In the first embodiment of a centrifugal speed governor indicated in FIG. 1, a centrifugal speed governor 12, of a conventional type of construction, is mounted within a governor housing 19. The centrifugal governor 12 is attached to a camshaft 10 of a fuel injection pump 11, indicated schematically. Flyweights 13 of the centrifugal governor 12 are pivotably mounted on a carrier 14 connected to the camshaft 10, and transmit their control forces via pressure arms 15 and a thrust bearing 16 to a governor sleeve 17 serving as a control member. The governor sleeve 17, in turn, is supported on a cylindrical pin extension 18 of the camshaft 10, engages at one end the thrust bearing 16 and is connected at its other end to a guide lever 22 by a pivot pin 23. This guide lever 22 is pivotable on a hinge pin 21 attached to the inside wall of the governor housing 19. The guide lever 22 carries a hinge pin 24, which serves as the pivot pin for a control lever 25. The control lever 25 is fashioned as a two-armed intermediate lever, which is pivotable, in turn, about a supporting pin 26 which serves as a fulcrum. The control lever 25 transmits the control movements of the governor sleeve 17 via a plate link 27 to a control rod 28, serving as the fuel feed rate adjusting member of the fuel injection pump 11.

The hinge pin 21 serves furthermore as a pivot pin affixed to the housing 19 for a force transmitting lever 31 under the resetting force of a control tension spring 29. The force transmitting lever 31 rests in a manner known per se on the governor sleeve 17 and contacts, in the illustrated position, with its end 31a facing away from the hinge pin 21, a stop 32 illustrated in a simplified fashion. The stop 32 is affixed to the housing 19. The control spring 29 is attached at one end to the force transmitting lever 31, and at the other end to a pivot lever 33 pivotable in the housing 19. The pivot lever 33 is operable by way of an operating lever 34 to vary the spring bias and the pivotal position of the control spring 29.

The supporting pin 26 of the control lever 25 is retained in a bifurcated opening 35 of a supporting lever 37. The supporting lever 37 is nonrotatably attached to a pivot axle 36 supported within the governor housing 19. A correction lever 38 of a correction device 39, operating in dependence on the fuel temperature, is likewise attached for rotation with the pivot axle 36. The correction lever 38 serves as an actuating lever. The correction lever 38 has a roller-shaped sensor member 41 which rests against a truncated-cone-shaped control surface 43 of a control sleeve 46. The correction lever 38 is biased away from the surface 43 by a return spring 42. The control sleeve 46 is guided on a guide pin 45. The guide pin 45 is attached in the housing 44 of the correction device 39. The return spring 42 will be described below in connection with FIGS. 2 and 3 and has been only schematically indicated in FIG. 1.

The control sleeve 46 serves as the transmitting member of the correction device 39, and it can be adjusted with respect to its position which determines the position of the correction lever 38, against the bias of a compression spring 47 by an expandable material gauge 48. The compression spring 47 serves as the resetting means in the direction of the longitudinal axis of guide pin 45, and the gauge 48 serves as the servo actuator of the correction device 39.

The correction device 39 shown with its essential features in FIG. 1 in a simplified view will now be explained in greater detail with reference to FIGS. 2 and 3 and the practical example illustrated therein:

The housing 44 contains all of the components of the correction device 39 disposed outside of the governor housing 19. In FIG. 2 there is shown, in a sectional view, the control sleeve 46 guided on the guide pin 45 and serving as the actuating member. The control sleeve 46 is held in contact with a pressure pin 49 of the expandable material gauge 48 by means of the compression spring 47. The compression spring 47 is supported at one end, on a shoulder of the control sleeve 46 and, at the other end, on a spring rest 51. The spring rest 51 contacts an eccentric mounting collar 52 of the guide pin 45, this collar being rotatable for the basic adjustment of the control sleeve 46. The mounting collar 52 is inserted in a bore 53 of the housing 44 and is held in the adjusted position by a ring nut 54 serving as a clamping means.

The expandable material gauge 48 is firmly clamped in a cap-shaped housing part 44a of the housing 44 by means of a flange 55. The expandable material gauge 48 thus projects into a chamber 56 serving as a fuel duct and formed by two bores extending at a right angle to each other. The fuel to be fed to the engine flows through this chamber and thus the gauge 48 assumes the instantaneously ambient fuel temperature. An advantageous arrangement, which can be realized in a simple manner, results if the chamber 56, as part of the fuel line, receives the fuel conveyed by the initial supply pump and transfers the fuel to the intake chamber of the injection pump 11.

Figure 3:
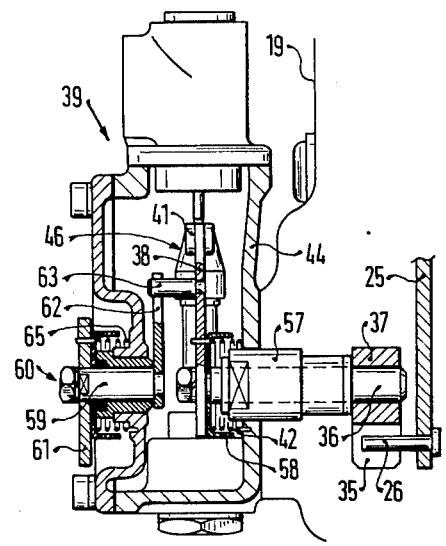
FIG. 3 is a view taken along line III—III in FIG. 2.

As can be seen from FIG. 3, the pivot axle 36 is fixedly joined to the supporting lever 37, and the correction lever 38 is rotatably arranged in a bearing bushing 57 mounted in the governor housing 19. The supporting lever 37 projects into the governor housing 19 and guides, with its bifurcated opening 35, the supporting pin 26 of the control lever 25. The return spring 42, fashioned as a torsion spring, is disposed within a capsule 58 in the interior of the housing 44 and is attached with one end to the correction lever 38 and with its other end to the housing 44. The bias of the torsion spring 42 tends to keep the correction lever 38 is constant contact with the control surface 43 of the control sleeve 46.

A second pivot axle 59 is supported in that part of the housing 44 so that it serves as an extension of the pivot axle 36, although as can be seen, it is separated from the latter. The pivot axle 59 carries a shutoff lever 61 outside of the device 39, and is provided with a pressure arm 62 within the housing 44. If the shutoff lever 61 is pivoted to cut off the fuel supply, then the pressure arm 62 entrains the correction lever 38 by way of an entraining pin 63 attached to the correction lever 38, thus pivoting the pivot axle 36 and accordingly also the supporting lever 37, in the clockwise direction (as seen in FIG. 2). During this step, the control lever 25 likewise pivots in the clockwise direction about its instantaneous hinge pin 24 and pulls the control rod 28 in the STOP direction (see minus direction of arrow 64). During this step, the correction lever 38 lifts off the control surface 43 against the force of the restoring spring 42 and returns to its original position, when the shutoff lever 61 is released and a return spring 65, acting in the same direction of rotation as the spring 42, entrains the lever 61 into its starting position, wherein the pressure arm 62, indicated in dot-dash lines in FIG. 2, is no longer in contact with the correction lever 38. By means of this arrangement, the shutoff device 60 does not affect the function of the correction device 39 and, conversely, the correction device 39 does not impede the operation of the shutoff device 60.

Figure 4:
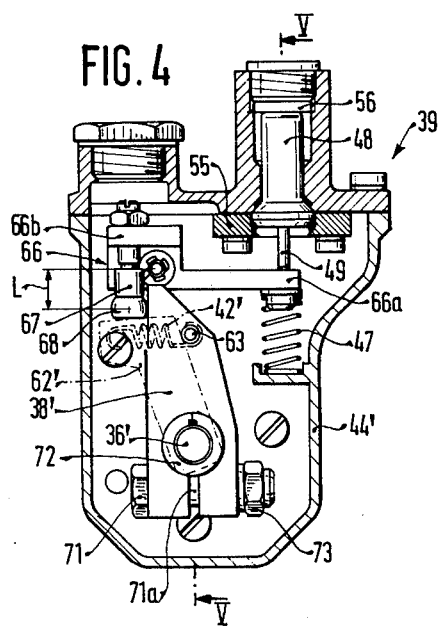
FIG. 4 is a partial cross sectional lateral view of a correction device according to a second embodiment of the present invention.
Figure 5:
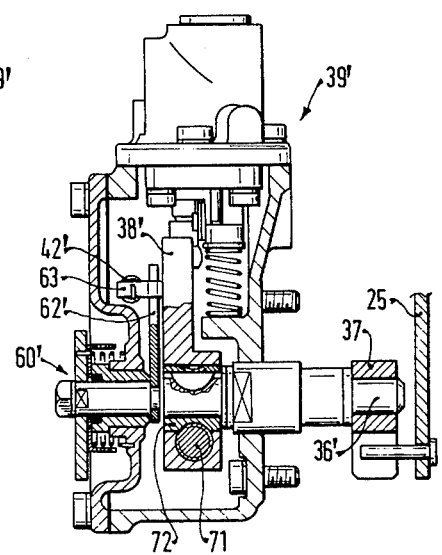
FIG. 5 is a view taken along line V—V in FIG. 4.

The second embodiment of a correction device 39' shown in FIGS. 4 and 5 is of a similar construction as the first embodiment and likewise comprises a correction lever 38' attached to a pivot axle 36' of the supporting lever 37. However, the transmitting member here is a control lever 66 pivotably arranged in the housing 44' of the correction device 39' and fashioned as a bell crank; one lever arm 66a of this control lever is under the effect of the expandable material gauge 48, and the other lever arm 66b is provided with a setscrew 67 serving as an abutment or stop member which is adjusted to vary the effective lever arm length L. A spherical head 68 of the setscrew 67 constitutes a stop which determines the rotary position of the pivot axle 36' and thus of the supporting lever 37. The compression spring 47 acting on the lever arm 66a of the control lever 66, and serving as the restoring means, retains this lever arm 66a in constant contact with the pressure pin 49 of the gauge 48.

Figure 2:
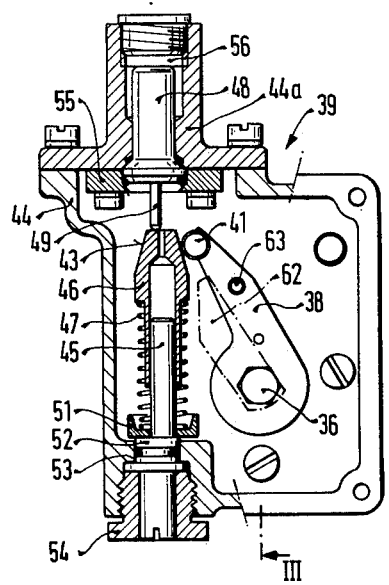
FIG. 2 is a simplified partial cross sectional lateral view of the correction device used in the governor of FIG. 1 to an enlarged scale.

The shutoff device 60' of the second embodiment has the same structure as that of the first embodiment illustrated in FIGS. 2 and 3, except that the pressure arm denoted by 62' has a slightly modified shape (see FIG. 4) since it serves as an abutment for the restoring spring 42'. The restoring spring 42' is formed as a tension spring, and is retained, at one end, by the pin 63 of the correction lever 38'.

The correction lever 38' can turn on the pivot axle 36' for basic adjustment by means of a setscrew 71. The setscrew 71 serves simultaneously as a mounting screw and is provided with a threaded section 71a serving as the adjusting spindle. In this arrangement, the threaded section 71a of the setscrew 71 engages a part 72 constructed in the manner of a gear wheel, and when the setscrew 71 is partially loosened, it is possible by turning this screw 71 to adjust the correction lever 38' relative to the part 72. By tightening a nut 73, the correction lever 38' is then retained in the adjusted position on the pivot axle 36'.

Figure 6:
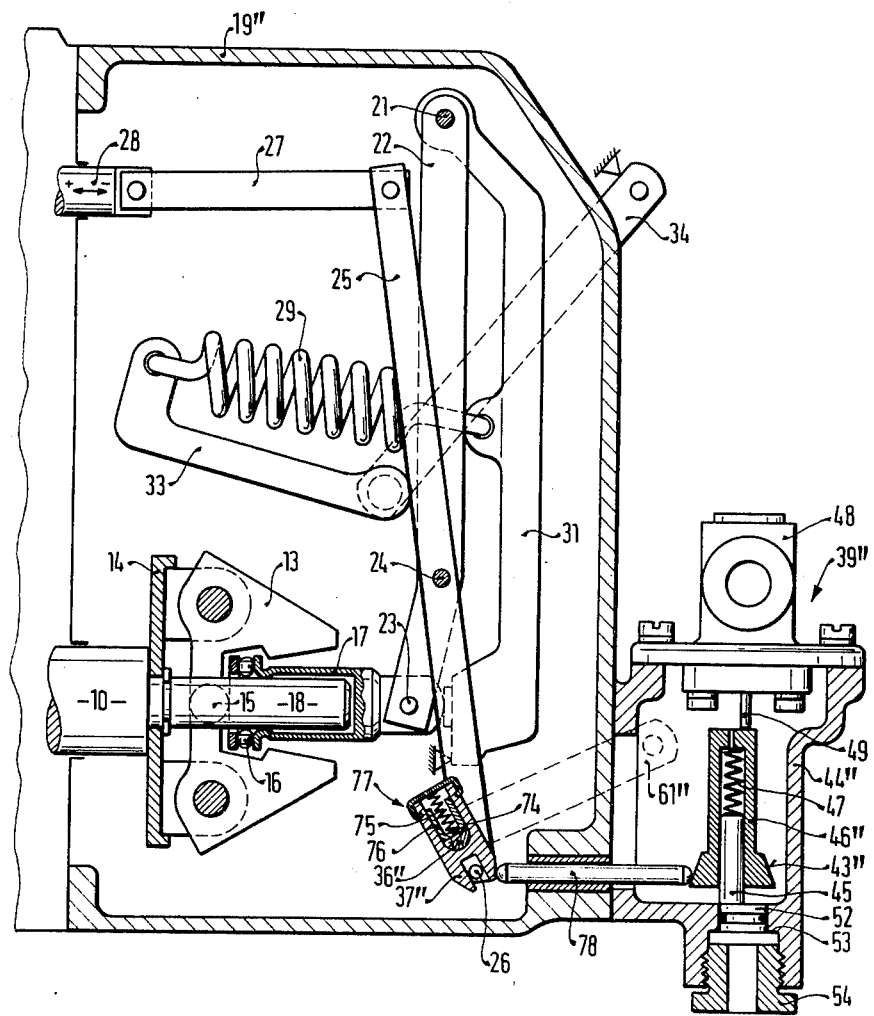
FIG. 6 illustrates a third embodiment of a centrifugal speed governor in which the correction device is attached to the end face.

In the third embodiment shown in simplified form in FIG. 6, the centrifugal speed governor has the same construction as in FIG. 1, except that the correction device, denoted by 39", is mounted with a housing 44" to the end face of the governor housing 19" in an extension of the axis of the camshaft 10. Within the governor housing 19", a supporting lever 37" is mounted on a pivot axle 36" to be rotatable against the force of a restoring spring 75. The restoring spring 75 is part of a drag link 77 and presses a hollow piston 76 onto a surface 74 of the pivot axle 36". This drag link 77 permits relative movements of the supporting lever 37" with respect to the pivot axle 36". A shutoff lever 61" is connected for rotation with the pivot axle 36" and is retained in the illustrated position by a restoring spring, not shown. For shutoff purposes, the shutoff lever 61" is pivoted in the clockwise direction, just as in the previously described embodiments, and the supporting lever 37" is likewise pivoted in the clockwise direction, along with the control lever 25, so that the control rod 28 is moved into its stop position. The supporting lever 37", in the starting position shown in FIG. 6, contacts an adjusting pin 78, serving as a sensor member, and is guided in the governor housing 19" in the axial direction of the camshaft 10, thus determining the position of the supporting pin 26. The adjusting pin 78 is supported, in turn, on a control surface 43" of a control sleeve 46" displaceably guided on the guide pin 45. The control sleeve 46" and the eccentrically adjustable guide pin 45 operate in the same way as the control sleeve 46 and the guide pin 45 in FIGS. 1-3 and are also actuated by the pressure pin 49 of the gauge 48 in opposition to the force of the compression spring 47. The hollow piston 76 is already pretensioned in the illustrated position in correspondence with the inclined position of the surface 74 on the pivot axle 36" and can, with the control sleeve 46" having moved downwardly, follow the corresponding movements of the adjusting pin 78, namely up to a position determined by the inclination of this surface 74. Thereby, the maximum correction of the correction device 39" is limited, for when the control sleeve 46" moves farther in the downward direction, the supporting lever 37" remains in the last-occupied position described above. This final position can also be reached by a correspondingly continuing cylindrical contour of the control surface 43".

If a shutoff device on the pivot axle 36" is not necessary or desirable, then the pivot axle 36" can also be firmly attached in the governor housing 19", and the supporting lever 37" is adjusted by the adjusting pin 78 of the correction device 39" against the action of the drag link 77. The drag link 77 is dual-acting, i.e., it is effective in two adjustment directions, so that the supporting lever 37" can yield even if the shutoff means engages the control rod 28, whereby an overloading of the governor linkage is avoided.

MODE OF OPERATION

The following description explains the mode of operation of the correction device of the speed governor constructed according to this invention, with reference to the embodiment illustrated in simplified form in FIG. 1.

The governor parts are illustrated in the positions occupied during full-load operation of the engine prior to reaching the final speed. The supporting pin 26, in the illustrated position, serves as an instantaneous fulcrum for the control lever 25 during control motions caused by the governor sleeve 17 and is determined by the rotational position of the correction lever 38 of the correction device 39 fixed by the control surface 43 of the control sleeve 46. If, during operation, heating of the fuel occurs due to high external temperatures, long-term full-load power, or reduced fuel volume in the tank, when this temperature rise results in a change in length of the expendible material gauge 48, and the pressure pin 49 moves the control sleeve 46—as seen in the position illustrated in FIG. 1—in opposition to the force of the spring 47 in the downward direction. During this step, the sensor member 41 of the correction lever 38 follows the contour of the tapering control surface 43 and executes a corresponding revolving motion in the counter-clockwise direction. In the same way, the supporting lever 37, connected for rotation via the pivot axle 36 to the correction lever 38, is likewise rotated, and the supporting point 26 of the control lever 25 is moved toward the right by the displacement of the bifurcate opening 35, serving as the guide means, whereby the control lever 25 likewise executes a pivoting motion in the counter-clockwise direction. During this process, the control rod 28 is shifted in the positive direction of arrow 64, which increases the fuel feed rate, and the amount to be injected is adapted.

As the temperature drops, the previously described control process is reversed, and the control rod 28 is adjusted in the direction toward reducing the feed rate into the negative direction of the arrow 64. The embodiments illustrated in FIGS. 4 and 5 as well as 6 have the same effect regarding the feed rate correction, except that the correction devices 39' and 39" have a modified structure, as has been noted.

What is claimed is:

1. A speed governor for fuel injected internal combustion engines, comprising:
   a governor sleeve displaceable as a function of engine speed;
   a fuel feed rate adjusting member;
   a control lever connected to the fuel feed rate adjusting member and displaceable by the governor sleeve;
   a supporting pin mounted on the control lever;
   a pivot axle;
   a supporting lever pivotably mounted by the pivot axle, said supporting lever being in engagement with the supporting pin; and
   a correction device including a servo actuator which is fuel temperature sensitive, a transmitting member which is adjustable by said servo activator, a return spring, a correction lever with one end engaging said transmitting member and actuated against the force of said return spring, said pivot axle is fixed to said supporting lever and said correction lever and rotatable by said correction lever against the force of said return spring, wherein said supporting lever is pivotably adjusted by said servo actuator during fuel temperature increases, and, through the supporting lever, the supporting pin and the control lever, the fuel feed rate adjusting member is adjusted toward an increasing feed rate in order to maintain engine power during the fuel temperature increases.

2. The speed governor as defined in claim 1, wherein the servo actuator comprises an expandible material gauge which projects into a fuel conduit of the engine fuel system.

3. The speed governor as defined in claim 1, wherein:
   (iv) the correction device further includes a second return spring;
   (v) the transmitting member comprises a control sleeve which is displaceable against the force of said a second return spring;
   (vi) the control sleeve includes a preferably truncated cone shaped control surface; and
   (vii) the correction lever includes a sensor member adapted to be pressed against the control surface by said return spring.

4. The speed governor as defined in claim 1, wherein:
   (iv) the correction device further includes a housing, a guide pin mounted to the housing of the correction device; and
   (v) the control sleeve is guided on the guide pin.

5. The speed governor as defined in claim 4, wherein:
   (vi) the housing of the correction device has a bore;
   (vii) the correction device further includes clamping means and a mounting collar mounted within said bore by said clamping means; and p1 (viii) the guide pin is eccentrically mounted to the mounting collar, and rotatable, to effect a basic adjustment thereof, by rotation of the mounting collar.

6. The speed governor as defined in claim 1, wherein:
   (iv) the correction device further includes a stop member; and
   (v) the transmitting member comprises a control lever pivotably mounted to the housing of the correction device and constructed as a bell crank, one lever arm of which is engageable by the servo actuator and the other lever arm of which is provided with the stop member which is adjustable for varying the effective lever arm length of said other lever arm.

7. The speed governor as defined in claim 6, wherein the stop member comprises a setscrew provided with a spherical head.

8. The speed governor as defined in claim 6, wherein:
   (vi) the correction device further includes a setscrew and a gear wheel mounted to the pivot axle for engagement with the setscrew; and
   (vii) the setscrew serves as a mounting screw for the correction lever and serves as a means for effecting a basic adjustment of the correction lever due to its engagement with the gear wheel.

9. The speed governor as defined in claim 1, wherein:
   (iv) the correction device further includes a shutoff lever mounted to the housing of the correction device separately from the supporting lever and from the correcting lever, a pressure arm connected to the shutoff lever and an entraining pin connected to the pressure arm; and
   (v) the shutoff lever acts on the correction lever via the pressure arm and the entraining pin only when the shutoff lever has been activated to cutoff the fuel supply.

10. The speed governor as defined in claim 1, further comprising:
    a shutoff lever mounted to the pivot axle; and
    a third return spring, wherein:
    (i) the correction device further includes a housing, a transmitting member which is adjustable by the servo actuator, and a sensor member comprising an adjusting pin;
    (ii) the transmitting member is located in the housing of the correction device and includes an inclined control surface engagable with the adjusting pin;
    (iii) the transmitting member is displaced by the servo actuator as a function of fuel temperature in a direction which is at right angles to the longitudinal axis of the fuel injection pump, the governor sleeve and the adjusting pin;
    (iv) the displacement of the transmitting member is transmitted to the supporting lever by the adjusting pin; and
    (v) said pivot axle is rotatable by the shutoff lever against the force of the return spring, and rotatable by the transmitting member through the adjusting pin and the supporting lever.

11. The speed governor as defined in claim 10, wherein:
    (vi) the correction device further includes a fourth return spring;
    (vii) the transmitting member comprises a control sleeve which is displaceable against the force of the return spring of the correction device; and
    (viii) the inclined control surface of the control sleeve is preferably a truncated cone shaped control surface.

12. The speed governor as defined in claim 11, wherein:
    (ix) the correction device further includes a guide pin mounted to the housing of the correction device;
    (x) the control sleeve is guided on the guide pin.

13. The speed governor as defined in claim 12, wherein:
    (xi) the housing of the correction device has a bore;

(xii) the correcting device further includes clamping means and a mounting collar mounted within said bore by said clamping means; and (xiii) the guide pin is eccentrically mounted to the mounting collar, and rotatable, to effect a basic adjustment thereof, by rotation of the mounting collar.

14. The speed governor as defined in claim 1, wherein:

(i) the correction device further includes a housing, a transmitting member which is adjustable by the servo actuator, and a sensor member comprising an adjusting pin;

(ii) the transmitting member is located in the housing of the correction device and includes an inclined control surface engageable with the adjusting pin;

(iii) the transmitting member is diplaced by the servo actuator as a function of fuel temperature in a direction which is at right angles to the longitudinal axis of the fuel injection pump, the governor sleeve and the adjusting pin;

(iv) the displacement of the transmitting member is transmitted to the supporting lever by the adjusting pin; and (v) said pivot axle is rotatable by the transmitting member through the adjusting pin and the supporting lever.

15. The speed governor as defined in claim 15, wherein:

(vi) the correction device further includes a fourth return spring;

(vii) the transmitting member comprises a control sleeve which is displaceable against the force of the return spring of the correction device; and (viii) the inclined control surface of the control sleeve is preferably a truncated cone shaped control surface.

16. The speed governor as defined in claim 15, wherein:

(ix) the correction device further includes a guide pin mounted to the housing of the correction device; and (x) the control sleeve is guided on the guide pin.

17. The speed governor as defined in claim 16, wherein:

(xi) the housing of the correction device has a bore;

(xii) the correcting device further includes clamping means and a mounting collar mounted within said bore by said clamping means; and (xiii) the guide pin is eccentrically mounted to the mounting collar, and rotatable, to effect a basic adjustment thereof, by rotation of the mounting collar.

* * * * *